(12) United States Patent
Balsari et al.

(10) Patent No.: US 11,930,807 B2
(45) Date of Patent: Mar. 19, 2024

(54) ANTI-DRIFT DIFFUSER FOR PNEUMATIC ATOMIZATION SPRAYERS

(71) Applicant: C.I.M.A. S.P.A., Montu' Beccaria (IT)

(72) Inventors: Paolo Balsari, Montu' Beccaria (IT); Paolo Smeraldi, Montu' Beccaria (IT)

(73) Assignee: C.I.M.A. S.P.A., Montu' Beccaria (IT)

( * ) Notice: Subject to any disclaimer, the term of this patent is extended or adjusted under 35 U.S.C. 154(b) by 367 days.

(21) Appl. No.: 17/253,932

(22) PCT Filed: Jun. 17, 2019

(86) PCT No.: PCT/IB2019/055019
§ 371 (c)(1),
(2) Date: Dec. 18, 2020

(87) PCT Pub. No.: WO2019/243982
PCT Pub. Date: Dec. 26, 2019

(65) Prior Publication Data
US 2021/0274769 A1    Sep. 9, 2021

(30) Foreign Application Priority Data

Jun. 19, 2018 (IT) .................... 102018000006466

(51) Int. Cl.
*A01M 7/00* (2006.01)
*B05B 7/00* (2006.01)
*B05B 12/16* (2018.01)

(52) U.S. Cl.
CPC ......... *A01M 7/0014* (2013.01); *B05B 7/0075* (2013.01); *B05B 7/0081* (2013.01); *B05B 12/16* (2018.02)

(58) Field of Classification Search
CPC ...... B05B 7/0081; B05B 7/0075; B05B 12/16
See application file for complete search history.

(56) References Cited

U.S. PATENT DOCUMENTS 3,685,743 A * 8/1972 Sebastiani .............. B05B 7/065
239/528
5,996,904 A * 12/1999 Smeraldi ............. A01M 7/0014
239/595

(Continued)

FOREIGN PATENT DOCUMENTS

| EP | 1 180 930 B1 | 5/2004 |
| EP | 1 745 698 B1 | 1/2010 |
| WO | 2013/007673 | 1/2013 |

OTHER PUBLICATIONS

International Search Report for PCT/IB2019/055019, dated Sep. 23, 2019, 2 pages.

*Primary Examiner* — Joseph A Greenlund
(74) *Attorney, Agent, or Firm* — NIXON & VANDERHYE (57) ABSTRACT

A method and an apparatus for the delivering of liquid mixtures of phytosanitary products is disclosed, equipped with a pneumatic liquid mixture atomization system which includes a fan for generating a carrier airflow through at least one diffuser with a conduit tapering towards a reduced section, and at least one delivery nozzle of the liquid mixture within the diffuser. The nozzle is provided with a delivery end arranged in a first delivery position within the airflow near to the reduced section and at least a second delivery position located downstream of the reduced section, where the airflow has a lower speed compared to the first position, and a controller selecting the first delivery position and the at least a second delivery position alternatively depending on a desired condition of reduction of drift effect the droplets of phytosanitary liquid.

19 Claims, 5 Drawing Sheets

(56) References Cited

U.S. PATENT DOCUMENTS

| | | | |
|---|---|---|---|
| 6,745,954 B1 | 6/2004 | Smeraldi | |
| 7,621,466 B2* | 11/2009 | Ko | C23C 24/04 239/398 |
| 10,220,398 B2* | 3/2019 | Saunders | F23D 1/005 |
| 10,342,934 B2* | 7/2019 | Hong | B05B 1/3073 |
| 2005/0040260 A1* | 2/2005 | Zhao | C23C 24/04 239/548 |
| 2006/0201418 A1* | 9/2006 | Ko | C23C 24/04 118/308 |
| 2007/0252020 A1* | 11/2007 | Smeraldi | A01M 7/0014 239/354 |
| 2009/0099737 A1* | 4/2009 | Wendte | A01D 41/1243 701/50 |
| 2015/0013769 A1* | 1/2015 | Saunders | A01M 7/0003 261/78.2 |
| 2015/0321206 A1* | 11/2015 | Swan | A01C 23/047 239/8 |
| 2018/0064091 A1 | 3/2018 | Clarke et al. | |
| 2018/0160670 A1* | 6/2018 | Pellenc | B05B 3/105 |
| 2018/0168140 A1* | 6/2018 | Pellenc | B05B 7/0081 |
| 2019/0134653 A1* | 5/2019 | Saunders | B01F 23/21322 |
| 2021/0274769 A1* | 9/2021 | Balsari | B05B 7/0081 |
| 2023/0302471 A1* | 9/2023 | Stout | B05B 7/04 239/102.2 |

\* cited by examiner

ANTI-DRIFT DIFFUSER FOR PNEUMATIC ATOMIZATION SPRAYERS

This application is the U.S. national phase of International Application No. PCT/IB2019/055019 filed 17 Jun. 2019, which designated the U.S. and claims priority to IT Patent Application No. 102018000006466 filed 19 Jun. 2018, the entire contents of each of which are hereby incorporated by reference.

FIELD OF THE INVENTION

The present invention relates to apparatuses for the nebulization/spray of liquid mixtures of phytoiatric products (water+phytosanitary product, hereinafter called "liquid mixtures of phytosanitary products" or simply "liquid") and their delivering on agricultural crops.

More specifically, the invention relates to a type of spraying apparatus known as pneumatic atomizer and also known as low volume atomizer, wherein the nebulization of the product takes place by introducing liquid substantially without pressure, through suitable nozzles, in the stream of an airflow generated by a generally centrifugal type fan.

TECHNICAL BACKGROUND

It is well known that, in pneumatic atomizer, the atomization of the liquid is obtained thanks to the kinetic energy of the air stream produced by a suitable fan, which also has the function of subsequently carrying the drops produced towards the target vegetation of agricultural cultivation. The liquid to be sprayed is introduced almost without pressure, through a suitable supply nozzle, at the centre of the airflow generated by the fan, generally in correspondence with a reduced section of an atomization diffuser, corresponding to the point where the speed of the air is the highest of the whole system.

Apparatuses of this type are described for example in EP 1180930 or EP1745698 on behalf of the same Applicant.

These apparatuses are different from those of pressure atomization, wherein the liquid is nebulized thanks to the kinetic energy of the liquid put under pressure by a pump and released by nozzles characterized by specific sizes and hole shapes.

This is not the context in which to further describe the differences between the two liquid atomization systems, but it should be noted that in the pressure ones, the size of the liquid droplets depends mainly on the outlet pressure of the liquid into the nozzle and the feature of this latter.

As known, in pneumatic atomization sprayers the drops are characterized by a good homogeneity of their size, which is normally small (Volumetric Medium Diameter, VMD=50-150 µm) compared to that obtainable with traditional pressure atomization nozzles.

This allows to increase, for the same volume delivered (l/ha), the coverage area of the target vegetation and also results in lower volumes usage of liquid compared to the pressure atomization systems, with the same area being sprayed.

However, it has been found that the fine atomization of the drops, makes them susceptible to being easily carried outside their target when there is atmospheric wind in correspondence of the spraying area. This phenomenon, called "product drift", entails drawbacks especially when peripheral areas of the agricultural area to be treated are sprayed, since it is obviously easier for the treatment liquid to be carried out of the interest area. The negative consequences are above all environmental damages. The drift of the treatment liquid is in fact considered one of the main sources of phytosanitary product pollution of the atmosphere, with possible health damage of people near the agricultural surface during the treatment—such as the people who live in the proximity of this territory—as well as the environment in general and in particular surface water courses.

With reference to this important environmental issue, it has already been noted that it is possible to reduce the drift effect by increasing the size of the droplets of the treatment product, which intuitively reduces its air transport capacity (because they tend to precipitate faster).

In spraying apparatuses with pressure atomization systems this result can be achieved by acting on the constructive characteristics of the nozzles to make them able to produce drops larger than the "traditional" ones of equal flow rate, with the same operating pressure. Thus "anti-drift" nozzles were conceived which in various European countries are classified according to the ISO 22831 standard which provides 6 drift reduction classes (A-B-C-D-E-F) with reductions ranging from over 25% to 99%. As a result, the farmer is able—depending on the environmental risk of the treatment liquid being used and the relative indications on the label, as well as the ambient conditions at the time of treatment—to replace the type of nozzle used from time to time.

Unlike the above, in the case of pneumatic atomization systems, the increase in the size of the drops produced by the pneumatic diffusers would theoretically be possible only by intervening on one at a time, or simultaneously on both, of the two physical factors specific of this type of liquid atomization: the flow rate of the liquid delivered and the speed of the air stream generated by the fan.

The increase in the flow rate of the delivered liquid would however cause an increase in the "volume delivered per surface unit (l/ha)" which, at the same concentration of the mixture, would determine an increase in the dose of phytosanitary product delivered per surface unit. This in addition to determining a higher cost, could cause damage to the vegetation, and lead to exceeding the maximum dosages legally permitted indicated on the phytoiatric product label. Furthermore, a greater volume of liquid delivered would increase the time required for treatment, with a consequent increase in costs.

The reduction in the speed of the air stream generated by the fan, on the other hand, would decrease the penetration of the drops into the target vegetation and therefore the effectiveness of the treatment.

The prior art also offers other liquid drops adjustment systems, which however are designed for different functions. For example, WO2013/007673 A1 describes a liquid atomization system, wherein a nozzle is mounted movable inside a converging conduit so as to be arranged in the area of maximum speed of the flow stream, to obtain a reduction in the size of the droplets that in this way have less tendency to aggregate.

Problem and Solution

The object of the present invention is to solve the problems described above by providing a pneumatic atomization spraying apparatus that is able to reduce the drift problem without excessive operating complications and without significantly affecting its design performances.

The aim is to be able to produce larger size drops without modifying both the volume of the delivered air and the output speed thereof, and the quantity of delivered liquid, thus maintaining the litres per hectare of distributed liquid and the ability to penetrate into the vegetation to be treated unchanged.

This scope is achieved by the features mentioned in the independent claims 1 and 10. The dependent claims describe preferred features of the invention.

In particular, the aforementioned scope is achieved by varying the position of the delivery point of the liquid, in particular on the axis of the airflow, moving it away from the maximum reduction of section of the diffuser, so that the delivery point of the liquid mixture occurs more downstream in the airflow, where the air speed is progressively lower and the pressure higher, and therefore such as to determine the increase in the diameter of the drops.

BRIEF DESCRIPTION OF THE DRAWINGS

Further features and advantages of the invention will anyhow be more evident from the following detailed description of some preferred embodiments, given by mere way of non-limiting example and illustrated in the accompanying drawings, wherein.

DETAILED DESCRIPTION OF PREFERRED EMBODIMENTS

In a way known per se—see for example EP 1745698, which is here considered as a reference—a pneumatic atomization spraying machine comprises essentially an air blower or fan and a delivery system of phytosanitary liquid mixture with operating pressure similar to that of the environment.

The blower is suitably driven by an agricultural machine (such as a tractor) or an autonomous motor and generates an air stream which is conveyed into one or more diffusers 1 suitably arranged (for example arranged in a fan-shaped pattern) on the apparatus. In the diffusers 1 a delivery nozzle 2 is placed for delivering the treatment liquid mixture.

The treatment liquid mixture arrives at the end of the nozzle 2 merely pushed, net of the load losses, from the head of liquid in a reservoir mounted on board on the machine; if the position of the nozzles 2 is higher than the level in the reservoirs, the mixture can be pushed by a centrifugal pump or similar to overcome the negative head determined by the difference in height between the liquid present in the main reservoir of the machine and the position of the nozzle: in any case, the liquid mixture is delivered by the nozzle with a pressure close to the that of the environment.

Typically, the delivery nozzle 2 of the liquid is mounted integral with the diffuser and has a release end 2a arranged in correspondence of a minimum diameter section of the diffuser 1—where therefore the speed of the air stream is maximum—for example in correspondence of the minimum section of a shaped Venturi tube diffuser.

According to the invention, it is envisaged that the delivery point of the liquid, hence the end 2a of the delivery nozzle 2, is mounted movable under different working conditions along the longitudinal axis of the diffuser 1 according to the desired drift reduction to be achieved.

Through extensive experimentation, it has in fact been found that the displacement of the delivery end 2a of the nozzle 2 inside the airflow stream and downstream of the minimum section of a diffuser 1, involves an increase in the size of the drops produced without presenting other side effects neither on their uniformity (in some cases it is even improved), nor on the flow rate delivered nor on the penetration into the target of the treatment liquid.

Figure 1A:
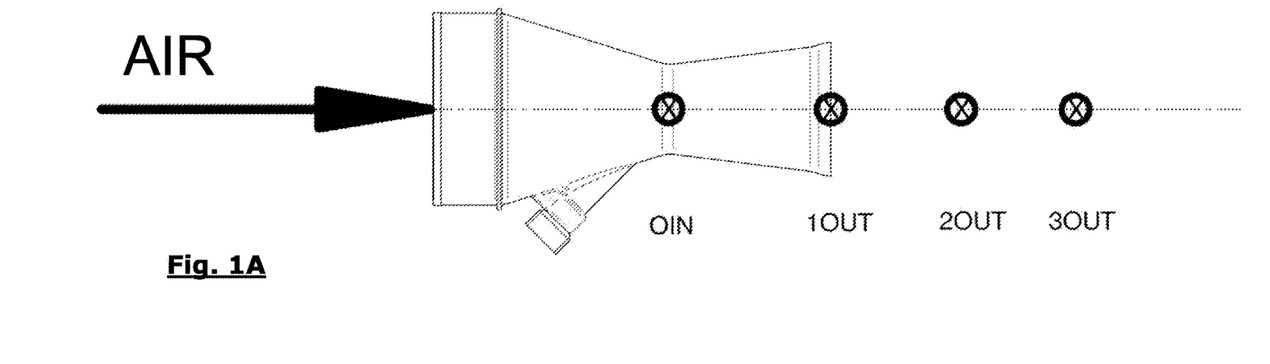
FIG. 1A is a schematic side elevation view of an exemplary diffuser with some reference points indicated along the stream of the airflow.
Figure 1B:
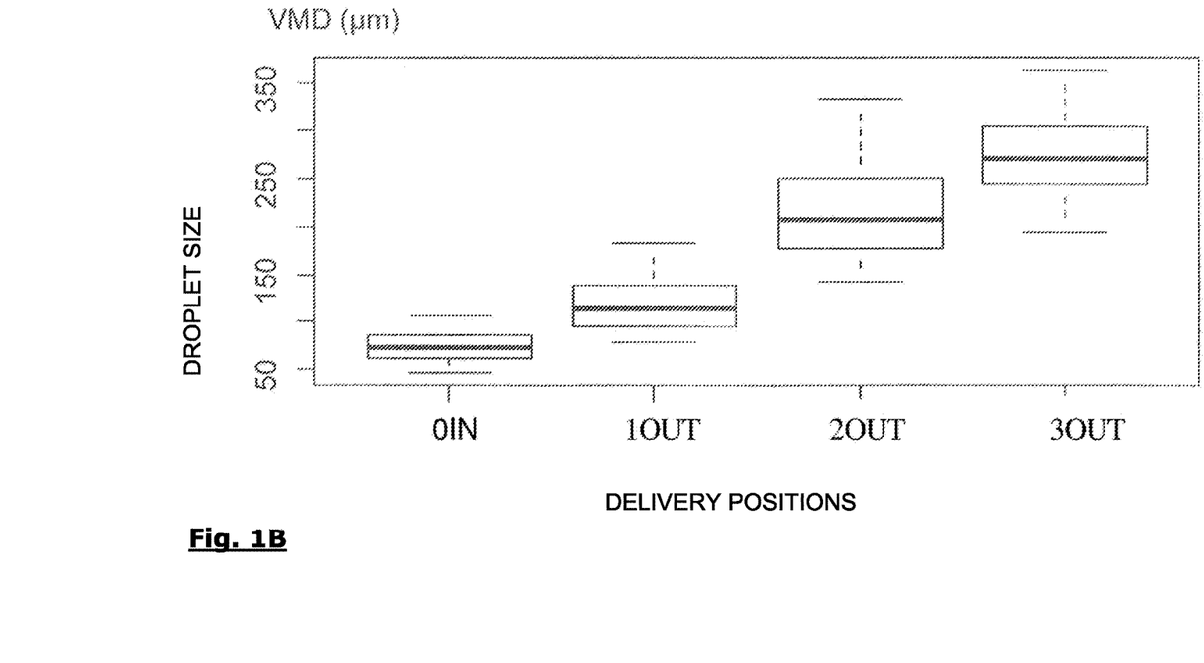
FIG. 1B is a diagram illustrating in an exemplary manner the size of the droplets in correspondence to the delivery positions illustrated in FIG. 1A.

In FIGS. 1A and 1B, by way of example, the effect of the displacement of the delivery end 2a along the axis of an exemplary diffuser 1 on the size of the achieved liquid droplets is illustrated.

As can be seen, moving away from the minimum section of the diffuser in the downstream direction of the airflow, the sizes of the liquid droplets are always larger. This phenomenon tends to be asymptotic, even if it has been found that, beyond a certain distance from the minimum section of the diffuser, unpleasant effects on other relevant parameters begin to appear, such as less uniformity of atomization with the production of some drops of excessive size which lead to treatment liquid losses on the ground.

The applicant has been able to ascertain that the overall beneficial effects on the reduction of the drift effect, with a significant reduction in the potential drift, are achieved by moving the delivery end downstream in the air stream, where the air speed is progressively lower, for example from 25% to 80%, compared to the speed in the minimum section point of the diffuser. This means that the nozzle 2 can be transferred downstream of the airflow also outside the diffuser, as can be understood from the diagram in FIG. 1A.

Note that the effect on the size of the liquid drops is determined directly but also indirectly by the decrease in the airflow speed. Indirectly, in fact, the reduction of the speed of the air stream also has an effect on the variation of pressure and possibly of turbulence at the location of the delivery end.

The inventive concept expressed herein is therefore based on a displacement of the delivery end of the liquid along the airflow stream, downstream of the minimum section point of the diffuser, which thus alters the local parameters at the delivery location, in a favourable way for the drift reduction, without having to intervene on the other operating parameters of the spraying apparatus.

Figures 2, 2A, 2B:
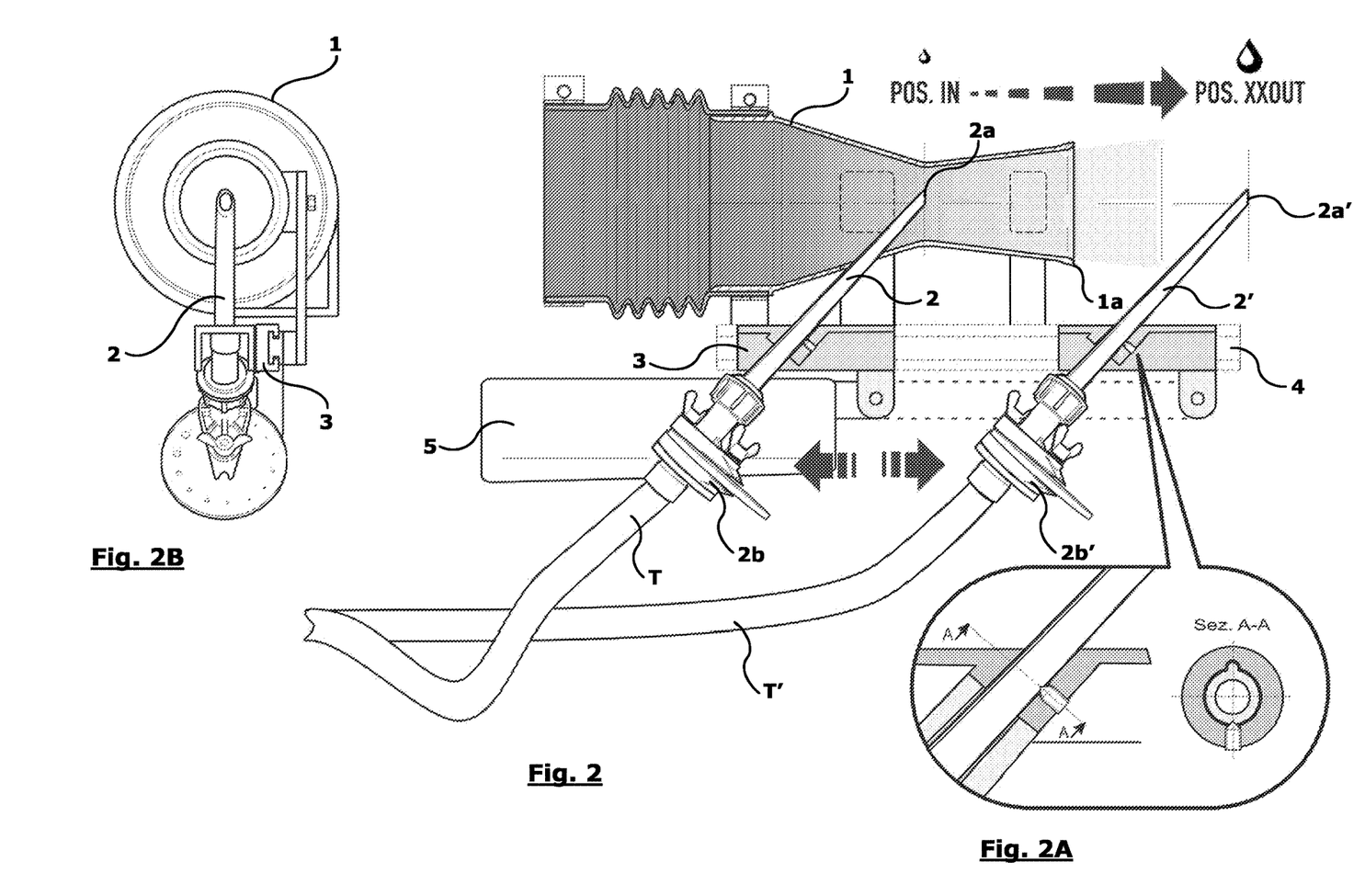
FIG. 2 is a side elevation view partially in cross section of a first embodiment of the invention, with the nozzle illustrated in two different positions.
FIG. 2A is a partial enlarged sectional view of a detail of FIG. 2.
FIG. 2B is an elevation front view of FIG. 2.

In FIGS. 2-2B a non limiting first embodiment of the invention is illustrated. In this case, the nozzle 2 is mounted on a support body 3, which is slidable along a rail 4 parallel to the axis of the diffuser 1. The nozzle 2 enters the diffuser through a cut out in the wall of the diffuser 1, which extends along the longitudinal axis of the diffuser 1 up to its outlet 1a. The nozzle 2 is also supplied with the treatment liquid by means of a joint 2b for connecting to a flexible supply tubing T.

To achieve the desired displacement, the support body 3 is connected to an actuator 5 of different nature, for example a linear piston electric or hydraulic actuator controlled by a trimmer, which is operated by the treatment operator near the area of interest, or automatically operated by a special software connected to a GPS system and/or by an anemometer mounted on the machine or located near thereto that detects the wind speed.

Thanks to this arrangement, said nozzle is able to move between a first work position (the one shown on the left in FIG. 2), wherein the delivery end 2a is located in a traditional way in a maximum carrier airflow speed area, and at least one other working position, displaced downstream compared to the first (the one shown on the right in FIG. 2), in the forward direction of the air stream.

The first work position is that wherein the spraying behaviour finds the best running conditions, therefore when there are no drift problems and the machine is optimized according to other spraying efficiency parameters. All the other positions taken by the nozzle 2 are those which progressively address—to a more or less pronounced extent—the need to reduce the drift, increasing the size of the droplets of treatment liquid, without compromising the overall behaviour upon spraying the crops.

According to a different embodiment (FIGS. 3A and 3B), which is also non-limiting, the displacement of the support body 3 is controlled by a rotating actuator 5' which rotates a worm screw 6, axially secured and engaged in a scroll seat within the support body 3.

Figures 3A, 3B:
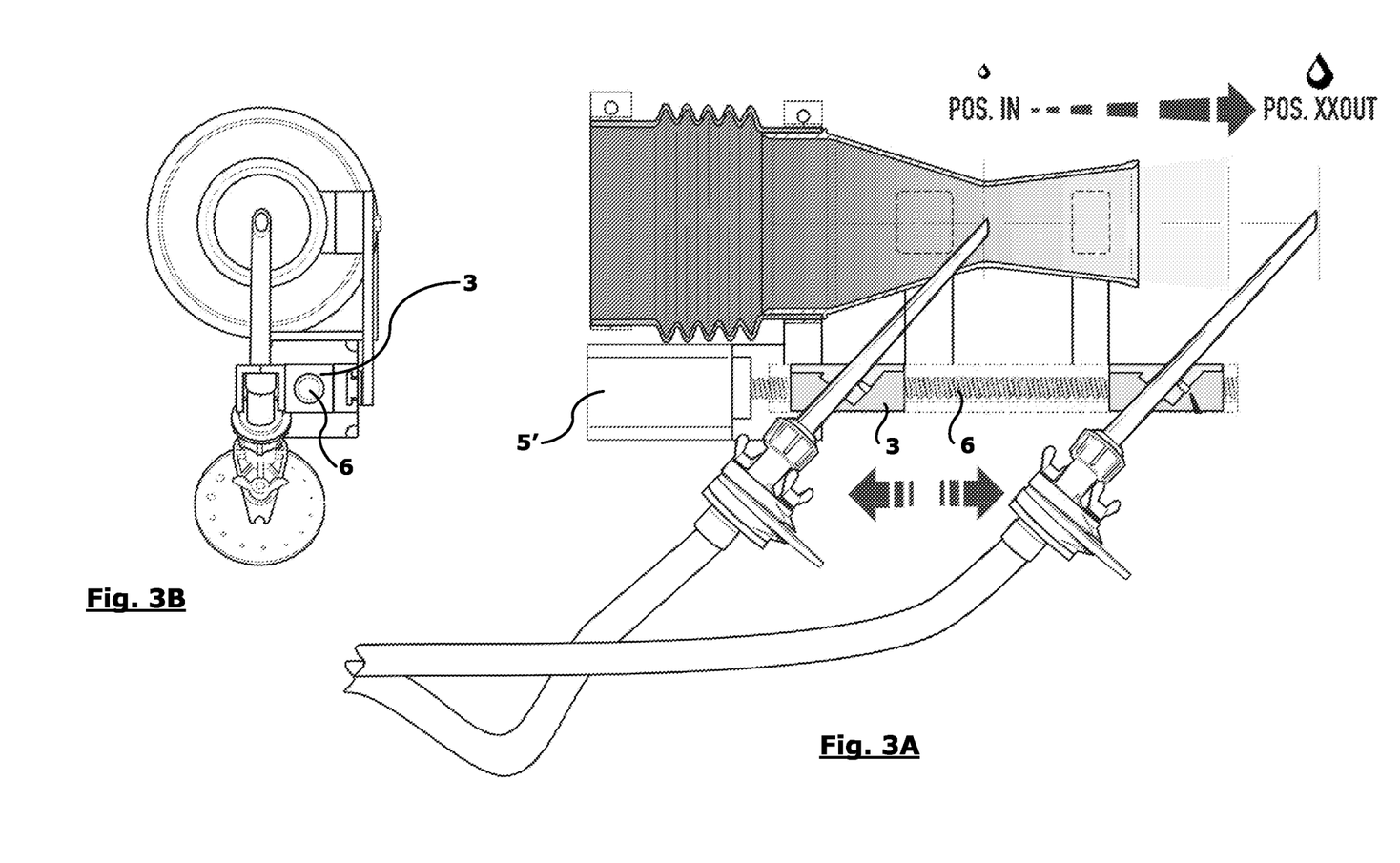
FIGS. 3A and 3B are similar views to FIGS. 2 and 2B, respectively, of a second embodiment.

These two embodiments, wherein the displacement of the support body 3 is carried out with a continuous actuation, certainly allow an accurate adjustment of the atomization of the liquid, in the desired extent from time to time based on the ambient conditions of the site operated and on the target coverage needs. However, this is an arrangement which, upon a very fine tuning possibility, has a non-negligible additional cost, bound above all to the usage of an actuator and the relative control.

On a practical level, in most cases a fine tuning is not necessary, but it is possible to use simpler arrangements with a limited number (for example two or three) of positions of the delivery nozzle.

Figures 4A, 4B:
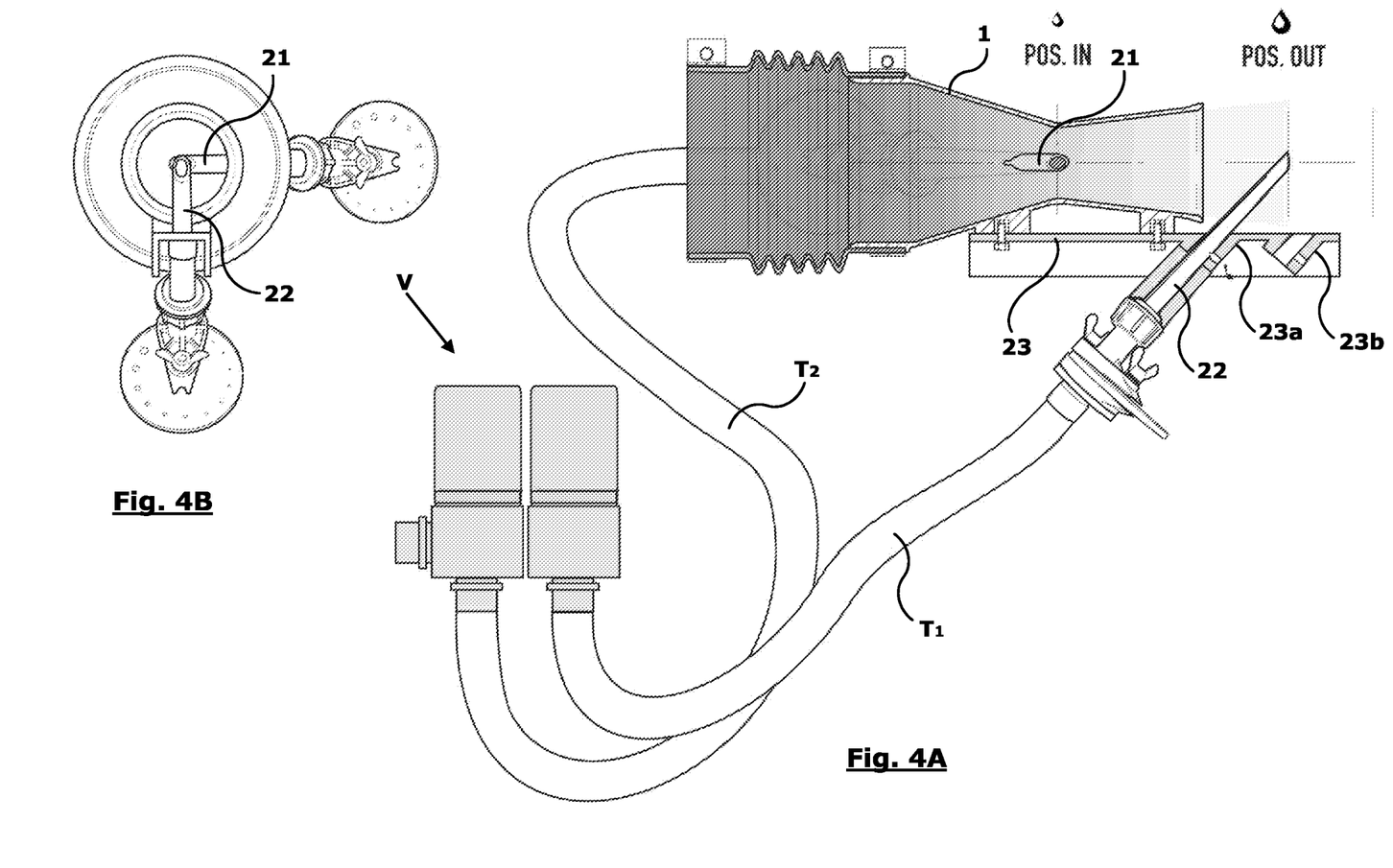
FIGS. 4A and 4B are similar views to FIGS. 3A and 3B, respectively, of a third embodiment.

In FIGS. 4A and 4B a third embodiment, for example, is illustrated wherein a Venturi diffuser is provided with two separate delivery nozzles 21 and 22, for example a first nozzle arranged in a traditional fixed position (i.e. with the delivery end at the minimum section of diffuser 1) indicated with "pos.in" and a second nozzle 22 arranged in a forward position downstream of the air stream as indicated with "pos.out". If the two nozzles 21 and 22 present clearance problems which do not allow close mounting, it is possible to arrange them on two different planes, for example on two planes passing through the longitudinal axis of the diffuser but rotated therebetween by about 90° (as clearly visible in FIG. 4B).

It is also possible to provide more than two nozzles, with the same mounting method, along the axis of the diffuser, so as to determine more than two delivery positions of the treatment liquid.

In this variant, the nozzle 22 is mounted on a support base 23 provided with two or more engagement seats 23a, 23b, . . . 23n which are used to position the nozzle 22 depending on the percentage of drift reduction to be achieved. In this case, the nozzle 22 can simply be disengaged from an engagement seat 23a and moved in another desired engagement seat 23b, . . . 23n, for example by acting with simple tools within the reach of any operator in the sector.

According to this embodiment, since the two nozzles must operate in an alternative way, by means of a control box of two solenoid valves V, it is possible to move the delivery of the liquid (via the tubes T1 and T2) from the "pos.in" (nozzle 21) to the "pos.out" (nozzle 22) when the apparatus is in correspondence with sensitive areas or in the case increases in atmospheric wind speed occur.

Figure 5:
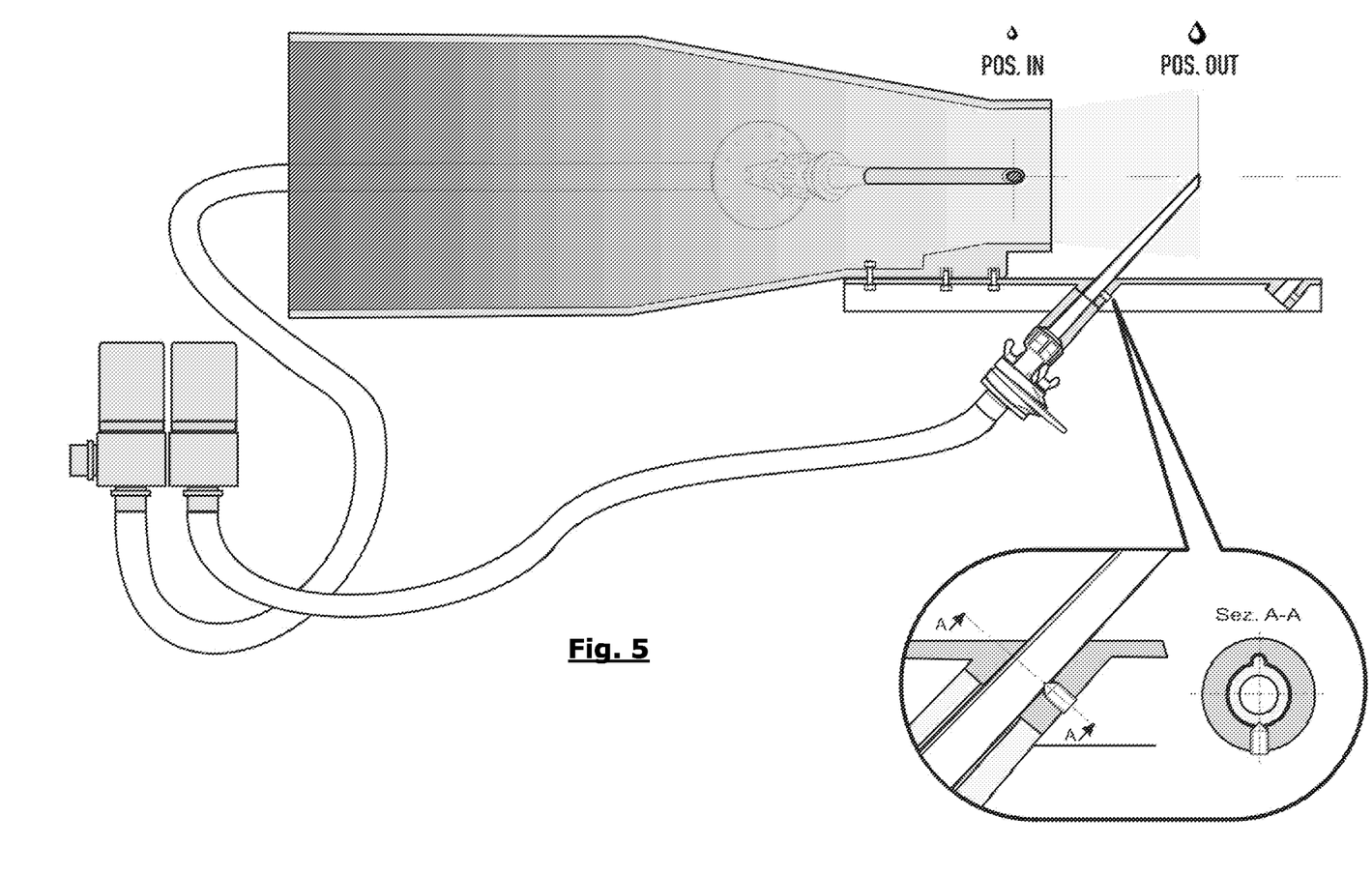
FIG. 5 is a view similar to that of FIG. 2 of a fourth embodiment.

In FIG. 5 a further embodiment, completely similar to the previous one, is illustrated where, however, the diffuser has a tapered section but is not designed as a Venturi tube. The operation is completely similar to that described above.

As is well understood from the above description, the arrangement according to the invention allows to increase the droplet size of the liquid, compared to the drop size of an optimized running situation, reducing the drift effect where desired, without modifying the other operating parameters of the pneumatic spraying machine (flow rate of the delivered liquid, speed and airflow rate generated by the fan).

It is understood, however, that the invention is not to be considered as limited by the particular arrangements illustrated above, which represent only exemplary embodiments of the same, but different variants are possible, all within the reach of a person skilled in the art, without departing from the scope of the invention itself, as defined by the following claims.

For example, although the illustrated embodiments always provide a nozzle that intercepts the diffuser wall—because this solution allows easy access to the nozzles and can be adopted as a 'retrofit' even on existing and installed devices—it is not excluded that the nozzle can be installed completely inside the diffuser, aligned with the air stream, while only a liquid delivery tube and a constraining and controlling bracket come out from the diffuser.

The invention claimed is:

1. A spraying apparatus for delivering liquid mixtures of phytosanitary products, the spraying apparatus equipped with a pneumatic liquid mixture atomization system which comprises:
   a fan for generating a carrier airflow through a conduit of a diffuser tapering towards a reduced section;
   at least one delivery nozzle for releasing said liquid mixture within said diffuser, said at least one delivery nozzle comprising a delivery end configured to be located in a first delivery position (pos.in) within said airflow at said reduced section, and in at least a second delivery position (pos.out) located downstream of said first delivery position (pos.in), external to the diffuser or at a location within the diffuser where the diffuser is wider than said reduced section, where the airflow has a lower speed compared to said first position; and
   control means for alternatively selecting said first delivery position and said at least a second delivery position depending on a desired condition of reducing a drift effect on droplets of phytosanitary liquid.

2. The apparatus of claim 1, wherein said at least one delivery nozzle is displaceable between a first work position wherein the delivery end of the delivery nozzle is in said first delivery position (pos.in) and a second work position wherein the delivery end of the delivery nozzle is in said second delivery position (pos.out).

3. The apparatus of claim 2, wherein said control means comprise a sliding support body, driven by an actuator, on which said at least one delivery nozzle is mounted.

4. The apparatus of claim 3, wherein said nozzle runs through a cut out in a wall of said diffuser.

5. The apparatus of claim 3, wherein said at least one delivery nozzle comprises at least two nozzles with respective delivery ends arranged at least in said first delivery position (pos.in) and in said second delivery position (pos.out), said control means comprising a shut-off valve which transfers said liquid mixture alternately among said at least two nozzles.

6. The apparatus of claim 3, wherein said first delivery position (pos.in) within said airflow is substantially in correspondence of a minimum section of said diffuser.

7. The apparatus of claim 2, wherein said nozzle (can be coupled with a plurality of engagement seats mutually spaced apart along an axis parallel to a longitudinal axis of said diffuser.

8. The apparatus of claim 7, wherein said at least one delivery nozzle comprises at least two nozzles with respective delivery ends arranged at least in said first delivery position (pos.in) and in said second delivery position (pos.out), said control means comprising a shut-off valve which transfers said liquid mixture alternately among said at least two nozzles.

9. The apparatus of claim 2, wherein said nozzle runs through a cut out in a wall of said diffuser.

10. The apparatus of claim 2, wherein said first delivery position (pos.in) within said airflow is substantially in correspondence of a minimum section of said diffuser.

11. The apparatus of claim 2, wherein said at least one delivery nozzle comprises at least two nozzles with respective delivery ends arranged at least in said first delivery position (pos.in) and in said second delivery position (pos.out), said control means comprising a shut-off valve which transfers said liquid mixture alternately among said at least two nozzles.

12. The apparatus of claim 9, wherein said at least one delivery nozzle comprises at least two nozzles with respective delivery ends arranged at least in said first delivery position (pos.in) and in said second delivery position (pos.out), said control means comprising a shut-off valve which transfers said liquid mixture alternately among said at least two nozzles.

13. The apparatus of claim 1, wherein said at least one delivery nozzle comprises at least two nozzles with respective delivery ends arranged at least in said first delivery position (pos.in) and in said second delivery position (pos.out), said control means comprising a shut-off valve which transfers said liquid mixture alternately among said at least two nozzles.

14. The apparatus of claim 13, wherein at least one of said two nozzles is displaceable between a first work position wherein the delivery end of the at least one of said two nozzles is in said first delivery position (pos.in) and a second work position wherein the delivery end of the at least one of said two nozzles is in said second delivery position (pos.out).

15. The apparatus of claim 14, wherein said at least one of said two nozzles is couplable with a plurality of engagement seats mutually spaced apart along an axis parallel to a longitudinal axis of said diffuser.

16. The apparatus of claim 1, wherein said first delivery position (pos.in) within said airflow is substantially in correspondence of a minimum section of said diffuser.

17. The apparatus of claim 1, wherein said second delivery position (pos.out) within said airflow is external to the diffuser.

18. The apparatus of claim 1, wherein the distance between said first delivery position (pos.in) and said second delivery position (pos.out) within said airflow is such that a speed difference of the airflow is about 25-80%.

19. A spraying method of crops with phytosanitary liquid in agriculture performed with the apparatus of claim 1, wherein
delivery of a phytosanitary liquid is switched from said first delivery position (pos.in) to said at least a second delivery position (pos.out) in correspondence of an operation at reduced drift spray flow.

* * * * *